(12) United States Patent
Watanabe et al.

(10) Patent No.: US 11,472,370 B2
(45) Date of Patent: Oct. 18, 2022

(54) ANCHOR DEVICE

(71) Applicant: KABUSHIKI KAISHA TOKAI-RIKA-DENKI-SEISAKUSHO, Aichi-ken (JP)

(72) Inventors: Yuki Watanabe, Aichi-ken (JP); Tomoyuki Horiyama, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 17/231,424

(22) Filed: Apr. 15, 2021

(65) Prior Publication Data

US 2021/0339701 A1 Nov. 4, 2021

(30) Foreign Application Priority Data

May 1, 2020 (JP) .............................. JP2020-081468

(51) Int. Cl.
*B60R 22/24* (2006.01)
(52) U.S. Cl.
CPC .................................. *B60R 22/24* (2013.01)
(58) Field of Classification Search
CPC .................................................... B60R 22/24
See application file for complete search history.

(56) References Cited

U.S. PATENT DOCUMENTS

| | | | |
|---|---|---|---|
| 7,413,371 B2 * | 8/2008 | Arnold | B60R 22/18 403/329 |
| 9,308,889 B1 * | 4/2016 | Denninger | B60R 22/19 |
| 9,814,282 B2 * | 11/2017 | Merrick | A44B 11/2523 |
| 2007/0132224 A1 * | 6/2007 | Hall | B60R 22/24 280/808 |
| 2019/0366974 A1 * | 12/2019 | Suminaka | B60R 22/24 |
| 2021/0128374 A1 * | 5/2021 | Esteireiro | B60R 22/30 |

FOREIGN PATENT DOCUMENTS

| | | | | |
|---|---|---|---|---|
| DE | 102019113310 A1 | * | 11/2019 | ............ B60R 22/24 |
| EP | 1798122 A1 | * | 6/2007 | ............ B60R 22/18 |
| JP | 3934273 B2 | * | 6/2007 | |
| JP | 2018127031 A | * | 8/2018 | |
| JP | 2019006204 A | * | 1/2019 | |
| JP | 2019048561 A | * | 3/2019 | |
| JP | 2019-202561 A | | 11/2019 | |
| JP | 2020152271 A | * | 9/2020 | |
| WO | WO-2020189640 A1 | * | 9/2020 | |

* cited by examiner

*Primary Examiner* — Nicole T Verley
(74) *Attorney, Agent, or Firm* — Calderon Safran & Cole P.C.

(57) ABSTRACT

In an anchor device, when a pin restriction portion of a spring plate moves so as to ride up over a large diameter portion of an attachment pin, a tilting movement tab of the spring plate undergoes tilting movement, and a cover undergoes tilting movement together with the tilting movement tab. When the plate is moved toward a device length direction one side with respect to the attachment pin and the large diameter portion moves to a device length direction another side relative to the pin restriction portion, the tilting movement tab elastically recovers and the cover returns to its original position. This enables whether or not the large diameter portion has moved to the device length direction another side relative to the pin restriction portion to be confirmed by visual inspection of the cover.

10 Claims, 16 Drawing Sheets

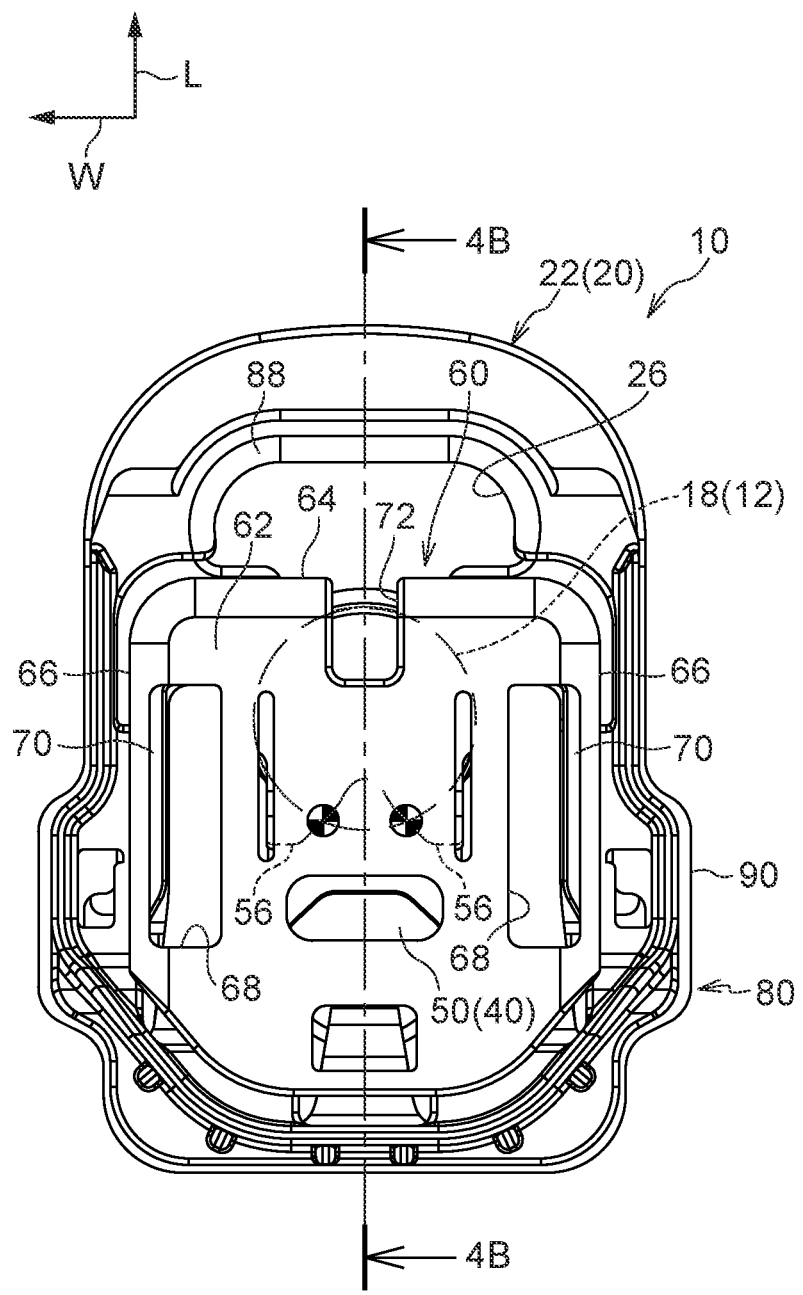

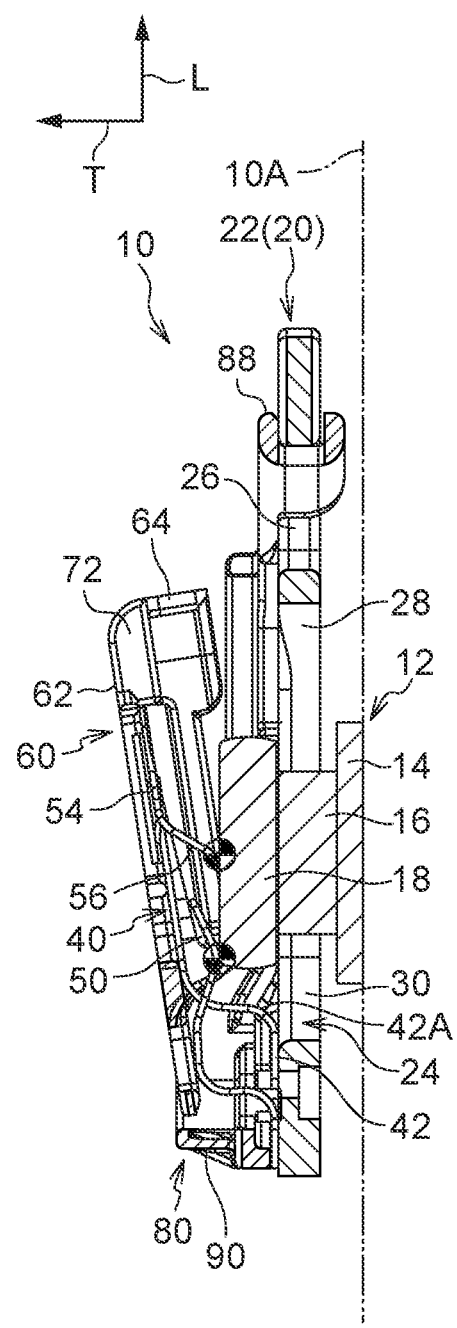

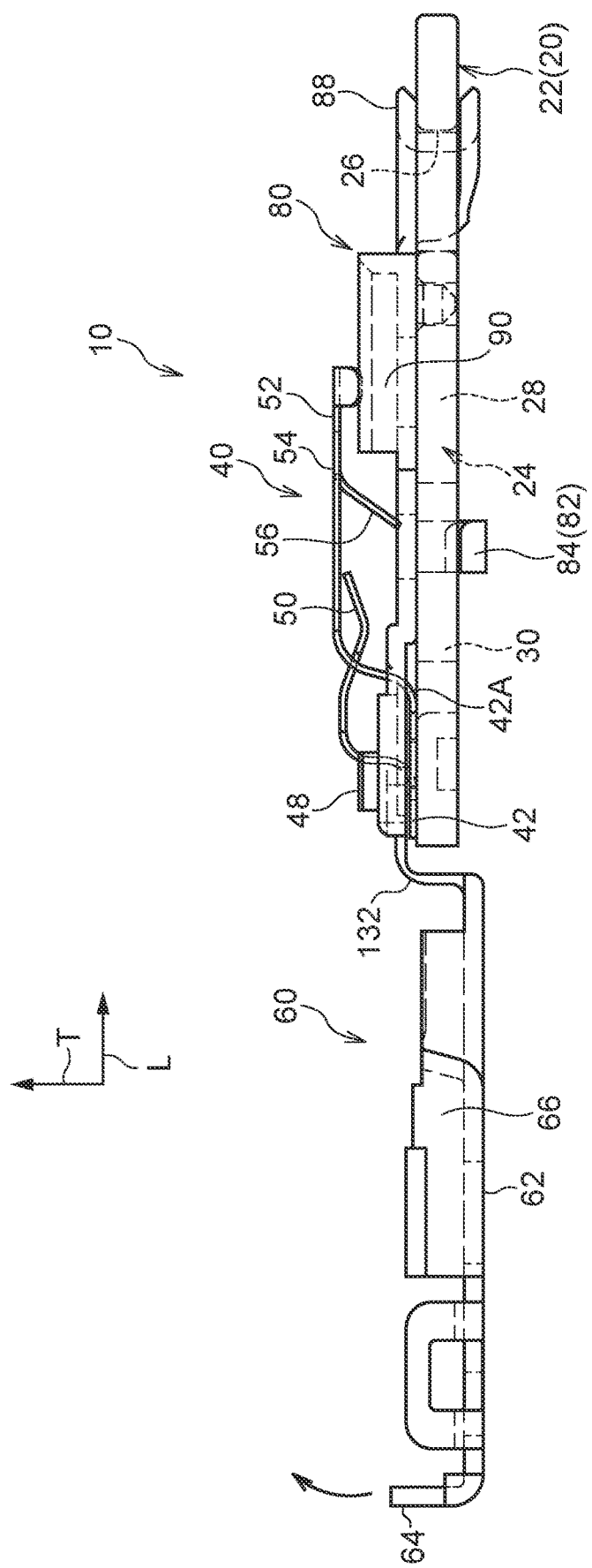

ANCHOR DEVICE

CROSS-REFERENCE TO RELATED APPLICATION

This application claims priority under 35 USC 119 from Japanese Patent Application No. 2020-081468 filed May 1, 2020, the disclosure of which is incorporated by reference herein.

BACKGROUND

Field of the Invention

The present disclosure relates to an anchor device coupling a vehicle body side and a webbing side.

Related Art

In an anchor device disclosed in Japanese Patent Application Laid-Open (JP-A) No. 2019-202561, when a stud disposed penetrating an opening in an anchor plate is moved with respect to the anchor plate and the stud reaches a locking region of the opening, the stud is restricted by an stop tab from returning to an enlarge-region of the opening. It would be desirable to have the ability to visually confirm whether or not the stud has reached the locking region of the opening, namely whether or not the anchor plate has been moved by a sufficient amount relative to the stud.

SUMMARY

In consideration of the above circumstances, an anchor device that enables visual confirmation of whether or not a second member has been moved in a coupling direction relative to a first member is obtained.

An anchor device of a first aspect includes: a first member that is provided at one of a vehicle body side or a webbing side of a vehicle; a second member that is provided at another of the vehicle body side or the webbing side of the vehicle, the second member being coupled to the first member by the second member being moved relative to the first member in a coupling direction intersecting a penetration direction in a state in which the second member penetrates the first member; a restriction member that is provided at the first member and that has a restriction portion which is moved by being pressed by the second member when the second member is moved relative to the first member in the coupling direction so as to couple to the first member, the restriction portion restricting movement of the second member relative to the first member in a direction opposite to the coupling direction by the restriction portion moving in a direction opposite to a direction of movement of the restriction portion due to pressing from the second member due to pressing by the second member being released in a state in which the second member is coupled to the first member; and a cover that is provided at the restriction member, that covers the restriction portion from a side of the direction of movement of the restriction portion due to pressing from the second member, and that is moved by movement of the restriction portion.

According to the anchor device of the first aspect, when the second member is moved relative to the first member in the coupling direction so as to couple to the first member, the restriction portion of the restriction member is pressed and moved by the second member. When the second member is moved in the coupling direction relative to the first member in a state in which the second member has been disposed penetrating the first member, so a coupled state between the first member and the second member is achieved, the pressing of the restriction portion of the restriction member by the second member is released, and the restriction portion of the restriction member is moved in the opposite direction to the direction of movement due to the pressing from the second member. The restriction portion that has moved in this manner restricts the second member from moving relative to the first member in the opposite direction to the coupling direction. The coupling between the first member and the second member is thereby maintained, thus maintaining the coupling between the vehicle body and the webbing through the anchor device. Moreover, in the coupled state of the first member and the second member, the cover covers the restriction portion of the restriction member from a side in the direction of movement of the restriction portion due to the pressing from the second member.

Note that the cover is moved by the movement of the restriction portion of the restriction member. Accordingly, it is possible to visually confirm both a state in which the cover has been moved by the movement of the restriction portion due to the pressing from the second member, and a state in which the cover has been moved by the movement of the restriction portion due to the pressing from the second member being released. A visual inspection for these states enables whether or not the second member has moved in the coupling direction relative to the first member (namely, whether or not the coupled state of the first member and the second member has been achieved) to be confirmed.

An anchor device of a second aspect is the anchor device of the first aspect, wherein one of the cover or the restriction portion includes opposing portions that mutually oppose each other in the direction of movement of the restriction portion due to pressing from the second member, and another of the cover or the restriction portion is disposed between the opposing portions.

According to the anchor device of the second aspect, the opposing portions are provided at one out of the cover or the restriction portion. The other of the cover or the restriction portion is capable of being disposed between the opposing portions. The opposing portions mutually oppose each other in the direction of movement of the restriction portion due to the pressing from the second member. Accordingly, disposing the other of the cover or the restriction portion between the opposing portions enables the cover to be made to move with the movement of the restriction portion.

An anchor device of a third aspect is the anchor device of either the first aspect or the second aspect, further including a load supporting member that is provided by a side of the cover in a direction intersecting the direction of movement of the restriction portion due to pressing from the second member, that is capable of supporting a load which is from the side in the direction of movement of the restriction portion due to pressing from the second member, and that suppresses the load from acting on the cover by supporting the load.

The anchor device of the third aspect includes the load supporting member. The load supporting member is provided by a side (at the outer side) of the cover in a direction intersecting the direction of movement of the restriction portion due to the pressing from the second member. The load supporting member is capable of supporting load from a side in the direction of movement of the restriction portion due to the pressing from the second member. By supporting the load with the load supporting member, such load can be suppressed from acting on the cover.

As described above, in the anchor device of the first aspect, the cover is moved by the movement of the restriction portion of the restriction member, thereby enabling whether or not a state in which the second member has moved in the coupling direction relative to the first member (namely a coupled state of the first member and the second member) has been achieved to be confirmed by visual inspection of the cover.

BRIEF DESCRIPTION OF THE DRAWINGS

Exemplary embodiments will be described in detail with reference to the following figures, wherein:

FIGS. 4A and 4B are diagrams illustrating a state in which an attachment pin is penetrating a communication hole, FIG. 4A being a plan view as viewed from a device thickness direction one side and FIG. 4B being a cross-section sectioned along line 4B-4B in FIG. 4A;

FIGS. 6A and 6B are diagrams illustrating a state in which a pin restriction portion of a spring plate has ridden up over a large diameter portion of an attachment pin, FIG. 6A being a plan view as viewed from a device thickness direction one side and FIG. 6B being a cross-section sectioned along line 6B-6B in FIG. 6A;

FIG. 12 is a side view illustrating an anchor device according to the fifth exemplary embodiment in a state in which a cover and a protector have been opened out flat.

DETAILED DESCRIPTION

Figure 1:
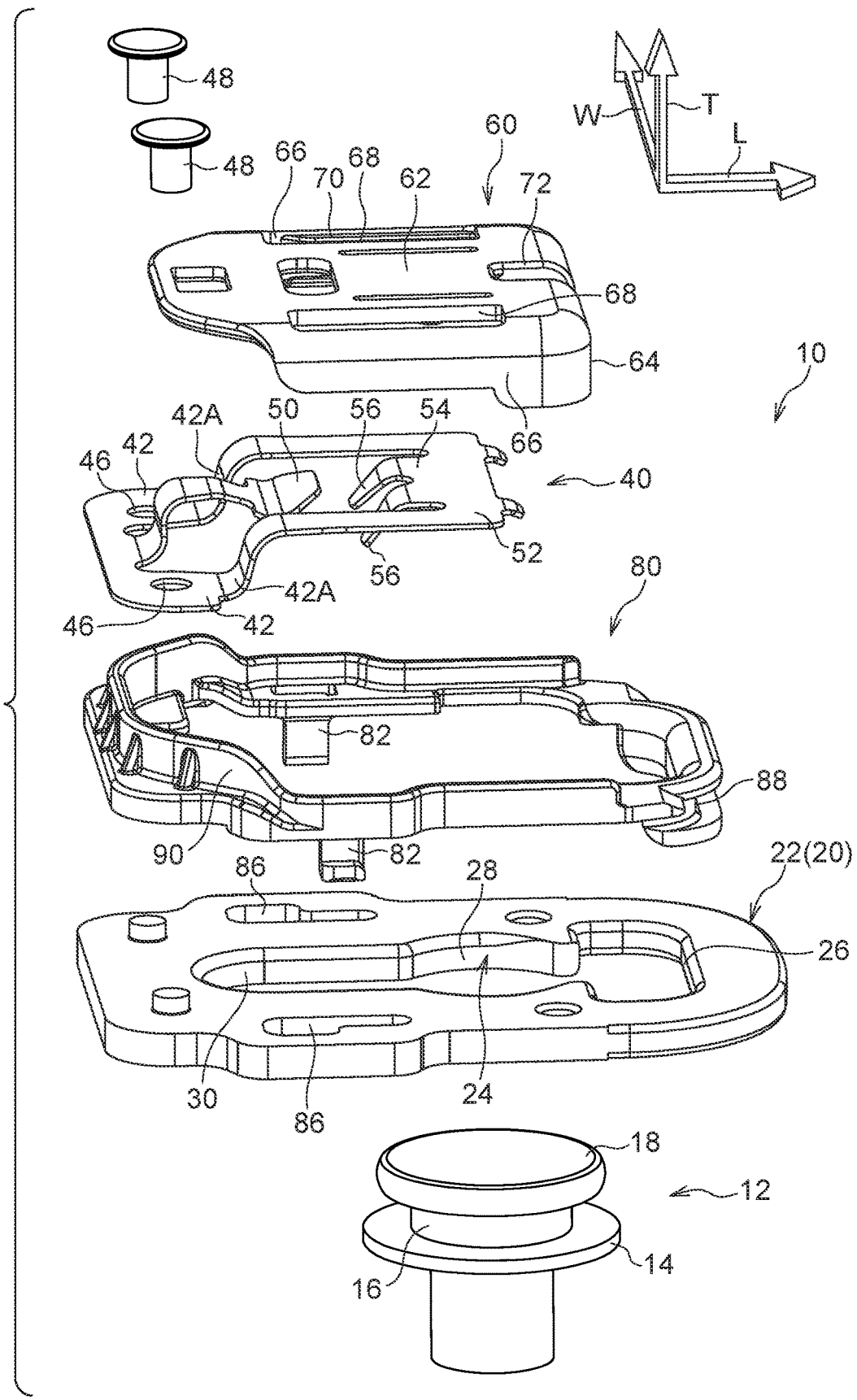
FIG. 1 is an exploded perspective view illustrating an anchor device according to a first exemplary embodiment.

Explanation follows regarding exemplary embodiments, with reference to FIG. 1 to FIG. 12. Note that in the respective drawings, the arrow L indicates a device length direction one side of an anchor device 10, the arrow W indicates a device width direction one side of the anchor device 10, and the arrow T indicates a device thickness direction one side of the anchor device 10, as appropriate. The device length direction, the device width direction, and the device thickness direction are employed as convenient terms in the following explanation of the exemplary embodiments. It is conceivable that depending on the shape of the anchor device 10, for example, the device length direction, the device width direction, and the device thickness direction may differ from the respective directions as employed in the following explanation.

In the explanation of the respective exemplary embodiments, locations that are substantially the same as those already described in a previous exemplary embodiment are allocated the same reference numerals, and detailed explanation thereof is omitted.

Configuration of First Exemplary Embodiment

As illustrated in FIG. 1, the anchor device 10 includes an attachment pin (anchor pin) 12 serving as a second member. The attachment pin 12 is formed entirely from metal, for example steel. The attachment pin 12 is, for example, disposed at a device length direction another side portion of a device thickness direction one side of a seat cushion (not shown in the drawings) of a front seat.

A device thickness direction one side portion of the attachment pin 12 is provided with a base 14, serving as a base portion, a small diameter portion 16, serving as a shaft portion, and a large diameter portion 18, serving as a head portion. The base 14 has a circular plate shape (or a circular column shape), and an axial center direction of the base 14 runs in the device thickness direction. A portion of the attachment pin 12 which is further toward the device thickness direction another side than the base 14 is fixed (coupled) to a vehicle body 10A such as a frame configuring the seat cushion of the front seat. The base 14 is thus integrated with the vehicle body 10A.

The small diameter portion 16 is provided on the device thickness direction one side of the base 14. The small diameter portion 16 has a circular column shape, and an external diameter dimension (size) of the small diameter portion 16 is smaller than an external diameter dimension of the base 14. An axial center direction of the small diameter portion 16 runs in the device thickness direction, and the small diameter portion 16 is disposed so as to be coaxial to the base 14. A device thickness direction another side end of the small diameter portion 16 is joined to a device thickness direction one side end of the base 14, and the small diameter portion 16 is integrated with the base 14.

The large diameter portion 18 is provided on the device thickness direction one side of the small diameter portion 16. The large diameter portion 18 has a circular column shape (or a circular plate shape), and an external diameter dimension of the large diameter portion 18 is larger than the external diameter dimension of the small diameter portion 16. An axial center direction of the large diameter portion 18 runs in the device thickness direction, and the large diameter portion 18 is disposed so as to be coaxial to the small diameter portion 16. An outer peripheral face of the large diameter portion 18 is curved so as to protrude outward with respect to the device thickness direction (axial direction) (such that the outer peripheral face of the large diameter portion 18 swells toward a radial direction outer side of the large diameter portion 18). A device thickness direction another side end of the large diameter portion 18 is joined to a device thickness direction one side end of the small diameter portion 16, and the large diameter portion 18 is integrated with the small diameter portion 16.

Figure 2:
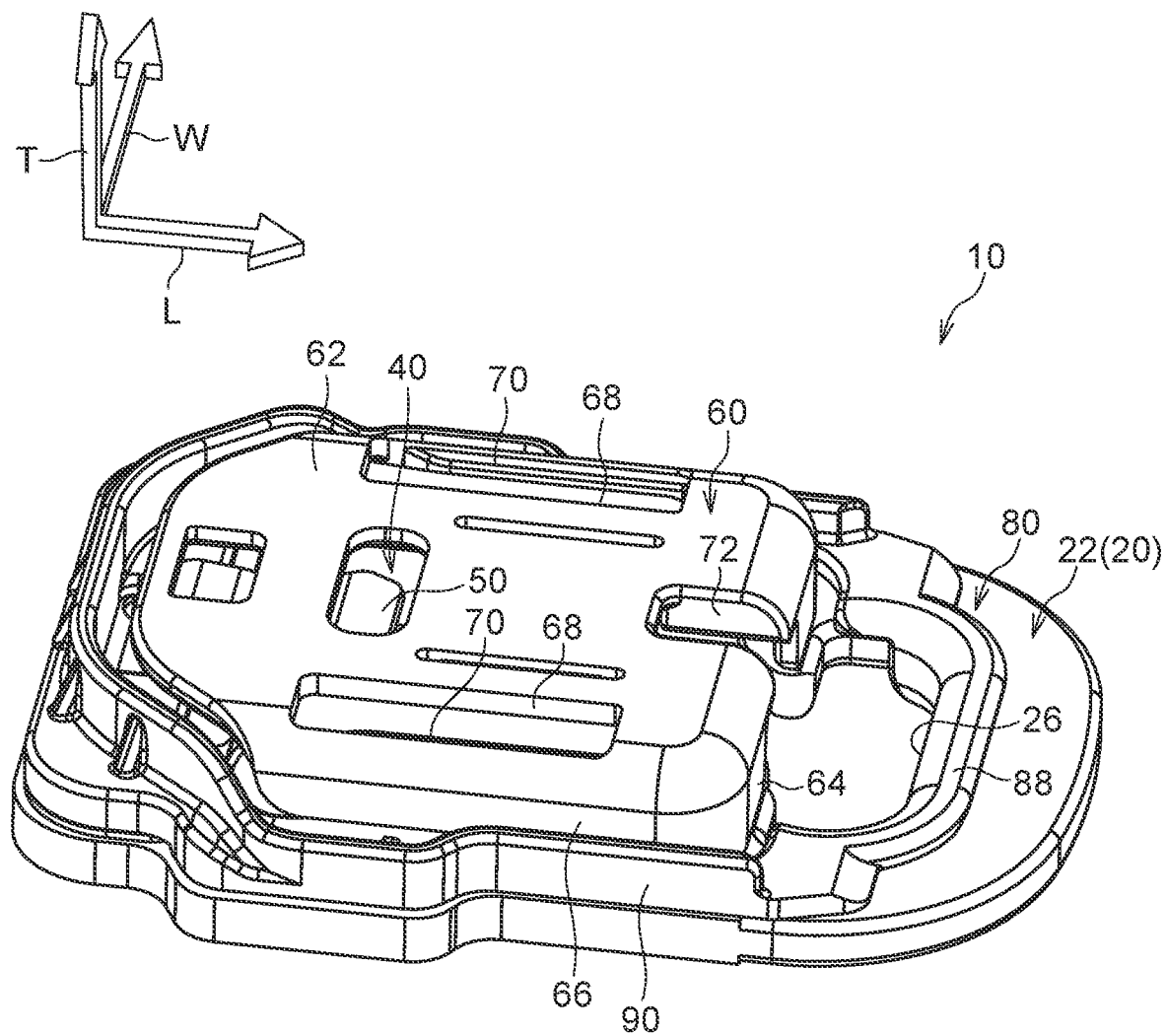
FIG. 2 is a perspective view illustrating an assembled state of an anchor device according to the first exemplary embodiment.

As illustrated in FIG. 1 and FIG. 2, the anchor device 10 includes a plate 20 (anchor plate). The plate 20 is provided with a plate body 22, serving as a first member. The plate body 22 is formed entirely from metal, for example steel (iron), and has a substantially rectangular plate shape. A thickness dimension (device thickness direction dimension) of the plate body 22 is smaller than an axial direction dimension of the small diameter portion 16 of the attachment pin 12 illustrated in FIG. 1.

As illustrated in FIG. 1 and FIG. 2, the plate body 22 is formed with a webbing-insertable portion 26, serving as a coupling portion, and a communication hole 24, serving as a through hole. The communication hole 24 is configured by a pin insertion portion 28 serving as an insertion portion, and a pin catch (stop) portion 30, serving as a retention portion. The webbing-insertable portion 26 is disposed at a device length direction one side portion of the plate body 22. The webbing-insertable portion 26 is structured as an elongated hole with its length in the device width direction, and penetrates the plate body 22 in the thickness direction of the plate body 22.

A length direction leading end portion of an elongated belt-shaped webbing (not shown in the drawings) configuring a vehicle seatbelt device together with the anchor device 10 is passed through the inside of the webbing-insertable portion 26. The length direction leading end portion of the webbing is passed through the inside of the webbing-insertable portion 26 from the device length direction one side of the webbing-insertable portion 26 and then folded back toward the device length direction one side. A portion of the webbing on a length direction leading end side with respect to this fold-back location is superimposed on a portion of the webbing on a length direction base end side with respect to the fold-back location in a thickness direction of the webbing, and is fixed to the portion of the webbing on the length direction base end side with respect to the fold-back location by stitching or the like. The length direction leading end portion of the webbing is thus anchored (coupled) to the plate 20.

The seatbelt device includes a webbing take-up device (not shown in the drawings). The webbing take-up device includes a spool, serving as a take-up shaft, and a length direction base end portion of the webbing is anchored to the spool. A tongue (not shown in the drawings) is provided at a length direction intermediate portion of the webbing. A buckle (not shown in the drawings) is provided on the opposite side of a sitting position of an occupant on the seat, for example the front seat, to the position where the anchor device 10 is disposed. The tongue is engaged with the buckle and retained by the buckle in a state in which the webbing has been wrapped across the body of the occupant sitting in the seat in order to achieve a fitted state of the webbing over the body of the occupant. In this fitted state of the webbing over the body of the occupant, the body of the occupant is capable of being restrained by the webbing.

As illustrated in FIG. 1, the communication hole 24 is a hole that penetrates the plate body 22 in its thickness direction, and is provided at (through) the plate body 22 on the device length direction another side of the webbing-insertable portion 26. An inner peripheral profile of the pin insertion portion 28 of the communication hole 24 is set larger than an outer peripheral profile of the large diameter portion 18 of the attachment pin 12, such that the large diameter portion 18 of the attachment pin 12 is capable of passing through the pin insertion portion 28.

The pin catch portion 30 of the communication hole 24 is formed on the device length direction another side of the pin insertion portion 28. The pin catch portion 30 is configured by an elongated hole with its length in the device length direction. One device length direction end of the pin catch portion 30 is in communication with the pin insertion portion 28. A device width direction dimension of the pin catch portion 30 is smaller than the external diameter dimensions of the base 14 and the large diameter portion 18 of the attachment pin 12, and slightly larger than the external diameter dimension of the small diameter portion 16 of the attachment pin 12. Accordingly, the small diameter portion 16 of the attachment pin 12 is able to pass along the pin catch portion 30. In a state in which the small diameter portion 16 has been passed along the pin catch portion 30, when moving the plate body 22 toward the device thickness direction one side relative to the attachment pin 12, the large diameter portion 18 of the attachment pin 12 abut the plate body 22 from the device thickness direction one side, thus restricting movement of the plate body 22 toward the device thickness direction one side.

Namely, when coupling the attachment pin 12 and the plate body 22 together, the large diameter portion 18 of the attachment pin 12 is passed through the communication hole 24 from the device thickness direction another side then the small diameter portion 16 of the attachment pin 12 is disposed penetrating through the inside of the pin insertion portion 28 of the plate body 22. From this state, the plate body 22 is moved toward the device length direction one side with respect to the attachment pin 12, such that the small diameter portion 16 moves relatively to a device length direction another side end portion of the pin catch portion 30 of the plate body 22 so as to achieve a coupled state between the attachment pin 12 and the plate body 22.

A spring plate 40, serving as a restriction member, is provided on the device thickness direction one side of the plate body 22. The spring plate 40 is structured by a substantially rectangular plate shaped frame, and is made of metal. A device width direction dimension of the spring plate 40 is slightly smaller than the device width direction dimension of the plate body 22. A leg 42 is formed on each of device width direction both sides of a device length direction another side portion of the spring plate 40, and fixing holes 46 are formed penetrating the device length direction another side portions of the legs 42. Rivets 48 are inserted through the respective fixing holes 46 and through the plate body 22, such that the spring plate 40 is fixed to the plate body 22 by the rivets 48. An upright portion 42A, serving as an elastic portion, is formed to a device length direction one side portion of each of the legs 42. The upright portion 42A is inclined toward the device thickness direction one side on progression toward the device length direction one side.

An urging portion 50 is integrally formed at the inside of a device length direction another side portion of the spring plate 40. The urging portion 50 is structured with a plate shape and has a substantially L-shaped cross-section profile. A device length direction another side portion of the urging portion 50 extends from a device width direction central portion of the device length direction another side portion of the spring plate 40 toward the device thickness direction one side. A device length direction one side portion of the urging portion 50 extends toward the device length direction one side, and the device length direction one side end portion of the urging portion 50 is enlarged toward both device width direction sides and curved and protruded with respect to the device length direction toward the device thickness direction another side.

A device length direction one side end portion of the urging portion 50 is pressed toward the device thickness direction one side by the large diameter portion 18 of the attachment pin 12, causing the urging portion 50 to undergo elastic deformation, particularly at a device length direction another side portion, and undergo elastic tilting movement toward the device thickness direction one side. The large diameter portion 18 is thereby sandwiched and gripped between the device length direction one side end portion of the urging portion 50 and the plate body 22 by the urging force of the urging portion 50, and a device thickness direction one side face of the plate body 22 makes pressing contact against a device thickness direction another side face of the large diameter portion 18, thereby restricting the plate body 22 from moving in the device thickness direction.

A portion of the spring plate 40 on the device length direction one side with respect to the upright portion 42A configures a main body portion 52, serving as a restriction portion. The main body portion 52 is disposed on the device thickness direction one side with respect to device length direction another side portions of the respective legs 42. A tilting movement tab 54 is integrally formed at the inside of a device length direction one side portion of the main body portion 52, and the tilting movement tab 54 extends from a device width direction central portion of the device length direction one side portion of the main body portion 52 toward the device length direction another side. A device length direction another side end portion (leading end portion) of the tilting movement tab 54 is formed with pin restriction portions 56. The pin restriction portions 56 extend in a direction toward the device thickness direction another side on progression toward the device length direction another side.

In a coupled state of the attachment pin 12 and the plate 20, the large diameter portion 18 of the attachment pin 12 is disposed on the device length direction another side with respect to the pin restriction portions 56. In this state, movement of the pin restriction portions 56 toward the device length direction another side is restricted (blocked) by the large diameter portion 18. Accordingly, movement of the plate 20 (the plate body 22 and the spring plate 40) toward the device length direction another side is restricted (blocked), such that the attachment pin 12 is retained in the plate 20.

The anchor device 10 further includes a cover 60. The cover 60 is, for example, molded (shaped) entirely from a synthetic resin material. The cover 60 includes a cover body 62 configuring an opposing (facing) portion. The cover body 62 is formed in a flat plate shape, and a thickness direction of the cover body 62 is aligned with the device thickness direction.

A first wall 64 is provided on the device length direction one side of the cover body 62. A device thickness direction one end of the first wall 64 is joined to a device length direction one end of the cover body 62. Second walls 66 are provided on both device width direction sides of the cover body 62. A device thickness direction one end of the second wall 66 which is on the device width direction one side is joined to a device width direction one end of the cover body 62, and a device thickness direction one end of the second wall 66 which is on the device width direction another side is joined to a device width direction another end of the cover body 62.

The cover 60 is also formed with a pair of elongated holes 68. The length of the elongated holes 68 runs in the device length direction. One of the elongated holes 68 is formed at a width direction one end portion of the cover 60. One side portion of this one elongated hole 68 relative to a width direction intermediate portion thereof is formed at an end portion on the device thickness direction one side of the second wall 66 which is on the device width direction one side, and penetrates the second wall 66 which is on the device width direction one side in a thickness direction of the second wall 66 which is on the device width direction one side. Another side portion of this one elongated hole 68 relative to the device width direction intermediate portion thereof is formed at an end portion on the device width direction one side of the cover body 62, and penetrates the cover body 62 in the thickness direction of the cover body 62.

On the other hand, the other elongated hole 68 is formed at a width direction another end portion of the cover 60. One side portion of the other elongated hole 68 relative to a width direction intermediate portion thereof is formed at an end portion on the device width direction another side of the cover body 62, and penetrates the cover body 62 in the thickness direction of the cover body 62. Another side portion of this other elongated hole 68 relative to the width direction intermediate portion thereof is formed at an end portion on the device thickness direction one side of the second wall 66 which is on the device width direction another side, and penetrates the second wall 66 which is on the device width direction another side in the thickness direction of the second wall 66 which is on the device width direction another side.

Figure 3:
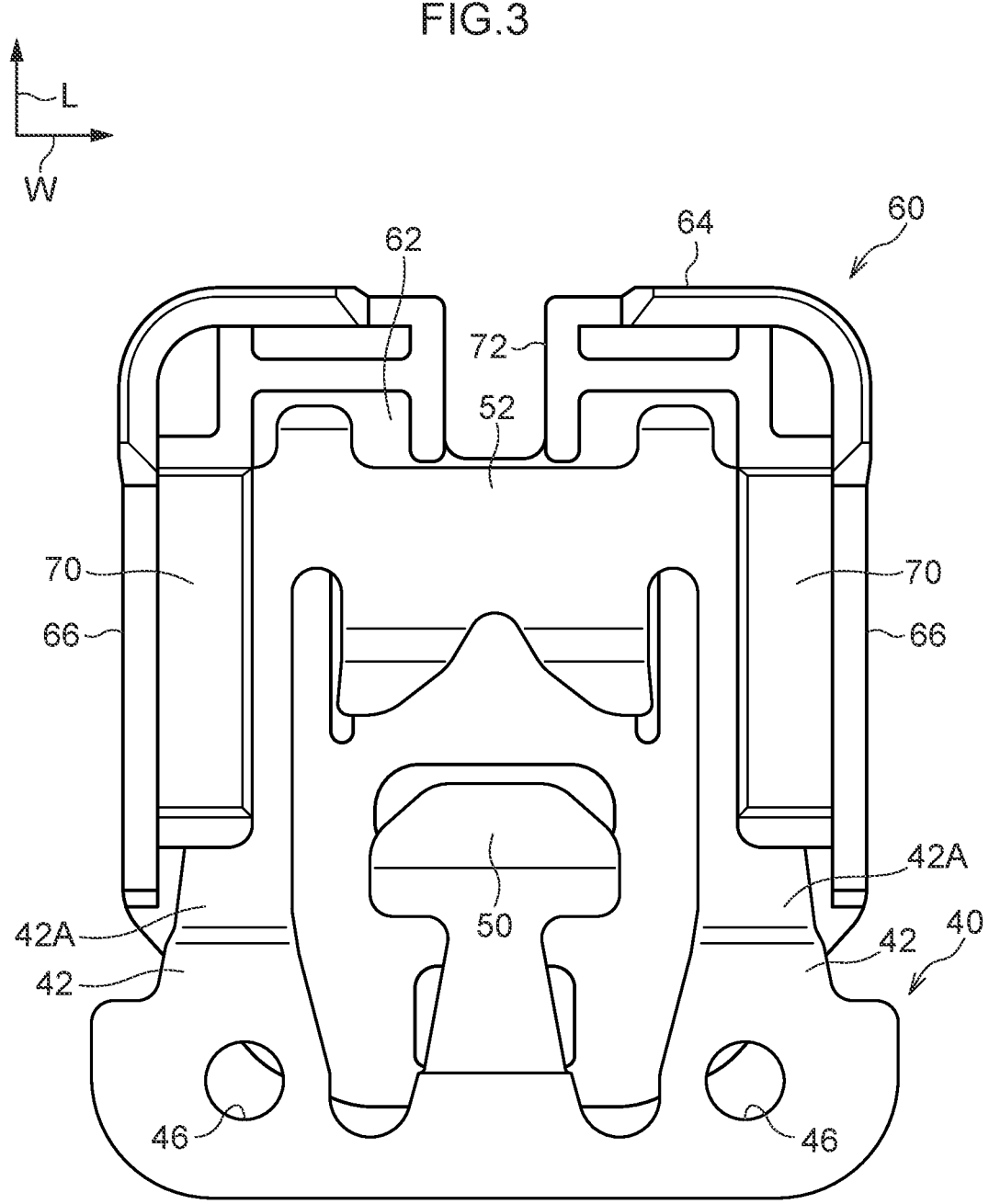
FIG. 3 is a diagram illustrating a cover and a spring plate as viewed from a device thickness direction another side.

As illustrated in FIG. 3, opposing walls 70, serving as an opposing portion, respectively extend from a face on the device width direction another side of the second wall 66 which is on the device width direction one side, and from a face on the device width direction one side of the second wall 66 which is on the device width direction another side. The opposing walls 70 are formed on the device thickness direction another side with respect to the positions where the elongated holes 68 are formed in the cover 60. A spacing between a device width direction another end of the opposing wall 70 which is on the device width direction one side and a device width direction one end of the opposing wall 70 which is on the device width direction another side is smaller than a width (device width direction) dimension (size) of the main body portion 52 of the spring plate 40.

Moreover, a device thickness direction spacing between device thickness direction one side faces of each opposing walls 70 and a device thickness direction another side face of the cover body 62 is slightly larger than a thickness (device thickness direction) dimension (size) of the main body portion 52 of the spring plate 40. Accordingly, when the cover 60 is moved toward the device length direction another side relative to the main body portion 52 of the spring plate 40 in a state in which a space on the device thickness direction another side of the cover body 62 on the device thickness direction one side of the opposing walls 70 opposes the main body portion 52 of the spring plate 40 in the device length direction on the device length direction one side, the main body portion 52 of the spring plate 40 can be disposed on the device thickness direction another side of the cover body 62 on the device thickness direction one side of the opposing walls 70. Movement of the cover 60 relative to the main body portion 52 along the device thickness direction is thereby restricted. Accordingly, when the main body portion 52 is moved toward a side in a axial-around (rotation) direction whose axial direction running in the device width direction, the cover 60 is moved together with the main body portion 52.

As illustrated in FIG. 1 and FIG. 2, an access hole 72 is formed in the cover 60. The access hole 72 is structured by an elongated hole. One side of the access hole 72 with respect to a length direction intermediate portion thereof is formed through one side portion of the first wall 64 of the cover 60 with respect to a device thickness direction intermediate portion of the first wall 64, and penetrates the first wall 64 in the thickness direction of the first wall 64 (in the device length direction). Another side of the access hole 72 with respect to the length direction intermediate portion thereof is formed through one side portion of the cover body 62 of the cover 60 with respect to a device length direction intermediate portion of the cover body 62, and penetrates the cover body 62 in the thickness direction of the cover body 62 (in the device thickness direction).

A width dimension of the access hole 72 is, for example, set to 5 mm. For example, a narrow width plate shaped tool with a width dimension of less than the width dimension of the access hole 72, or a rod shaped tool with an external diameter dimension of less than the width dimension of the access hole 72, is able to pass through the access hole 72 such that a length direction leading end portion of such a tool can be disposed on the device thickness direction another side of the main body portion 52 of the spring plate 40.

The anchor device 10 further includes a protector 80. The protector 80 is molded (shaped) entirely from a synthetic resin material. As illustrated in FIG. 1, the protector 80 is formed in a rectangular frame shape overall as viewed along the device thickness direction. The protector 80 includes a pair of engagement claws 82. One of the engagement claws 82 is formed projecting from a device thickness direction another side face of a device width direction one side portion of the protector 80. The other of the engagement claws 82 extends from the device thickness direction another side face of a device width direction another side portion of the protector 80. A claw hook 84 on the device thickness direction another end side with respect to a device thickness direction intermediate portion of the engagement claw 82 which is on the device width direction one side is formed projecting toward the device width direction one side. A claw hook 84 on the device thickness direction another end side with respect to a device thickness direction intermediate portion of the engagement claw 82 which is on the device width direction another side is formed projecting toward the device width direction another side.

The plate body 22 is formed with a pair of engagement holes 86 corresponding to the engagement claws 82. One of the engagement holes 86, corresponding to the one engagement claw 82, is formed on the device width direction one side of the plate body 22, and the other of the engagement holes 86, corresponding to the other engagement claw 82, is formed on the device width direction another side of the plate body 22. The engagement holes 86 are elongated holes, and the length direction of the engagement holes 86 runs in the device length direction. The engagement holes 86 penetrate the plate body 22 in the thickness direction of the plate body 22.

A device width direction dimension of each of the engagement holes 86 at a portion on the device length direction another side with respect to a device length direction intermediate portion of the corresponding engagement hole 86 is larger than a maximum dimension of the corresponding engagement claw 82 in the device width direction. Accordingly, each of the engagement claws 82 is capable of passing through each of the engagement holes 86 at the portion on the device length direction another side with respect to the device length direction intermediate portion of the engagement hole 86.

At a portion of each of the engagement holes 86 on the device length direction one side with respect to the device length direction intermediate portion of the corresponding engagement hole 86, the device width direction dimension of the engagement hole 86 is smaller than that of the portion of the engagement hole 86 on the device length direction another side with respect to the device length direction intermediate portion of the engagement hole 86. In the engagement hole 86 which is on the device width direction one side, a device width direction one side end of the portion of the engagement hole 86 on the device length direction one side with respect to the device length direction intermediate portion of the engagement hole 86 is positioned further toward the device width direction another side than a device width direction one side end of portion of the engagement hole 86 on the device length direction another side with respect to the device length direction intermediate portion of the engagement hole 86 which is on the device width direction one side.

Accordingly, at the portion on the device length direction one side with respect to the device length direction intermediate portion of the engagement hole 86 which is on the device width direction one side, a portion of the engagement claw 82, which is on the device width direction one side, on the device thickness direction one side with respect to the claw hook 84 of the engagement claw 82 is capable of passing through the engagement hole 86 which is on the device width direction one side. However, at this portion, the claw hook 84 of the engagement claw 82 which is on the device width direction one side is not capable of passing through the engagement hole 86 on the device width direction one side.

Regarding the engagement hole 86 which is on the device width direction another side, at a portion of the engagement hole 86 on the device length direction one side with respect to the device length direction intermediate portion of the engagement hole 86, a device width direction dimension of the engagement hole 86 is smaller than that of a portion of the engagement hole 86 on the device length direction another side with respect to the device length direction intermediate portion. In the engagement hole 86 which is on the device width direction another side, a device width direction another side end of the portion of the engagement hole 86 on the device length direction one side with respect to the device length direction intermediate portion of the engagement hole 86 is positioned further toward the device width direction one side than a device width direction another side end of portion of the engagement hole 86 on the device length direction another side with respect to the device length direction intermediate portion of the engagement hole 86 which is on the device width direction another side.

Accordingly, at the portion on the device length direction one side with respect to the device length direction intermediate portion of the engagement hole 86 which is on the device width direction another side, a portion of the engagement claw 82, which is on the device width direction another side, on the device thickness direction one side with respect to the claw hook 84 of the engagement claw 82 is capable of passing through the engagement hole 86 which is on the device width direction another side. However, at this portion, the claw hook 84 of the engagement claw 82 which is on the device width direction another side is not capable of passing through the engagement hole 86 which is on the device width direction another side.

In a state in which portions of the engagement claws 82 on the device thickness direction one side with respect to the claw hooks 84 are disposed penetrating the portions of the engagement holes 86 on the device length direction another side with respect to the device length direction intermediate portions of the engagement holes 86, when the protector 80 is moved toward the device length direction one side relative to the plate body 22, the positions where the portions of the engagement claws 82 on the device thickness direction one side with respect to the claw hooks 84 penetrate the engagement holes 86 shift toward the device length direction one side with respect to the device length direction intermediate portions of the engagement holes 86. In this state, the claw hooks 84 of the engagement claws 82 oppose the plate body 22 from the device thickness direction another side of the plate body 22. Movement of the protector 80 in the device thickness direction relative to the plate body 22 is thereby restricted.

The protector 80 further includes a webbing protector portion 88. The webbing protector portion 88 is formed to a device length direction one side end portion of the protector 80. In a state in which the two engagement claws 82 described above are disposed penetrating the portions of the two engagement holes 86 on the device length direction another side with respect to the device length direction intermediate portions of the engagement holes 86, the webbing protector portion 88 is disposed at the inside of the webbing-insertable portion 26 of the plate body 22.

In this state, when the protector 80 is moved toward the device length direction one side relative to the plate body 22 such that the positions where the portions of the engagement claws 82 on the device thickness direction one side with respect to the claw hooks 84 penetrate the engagement holes 86 shift toward the device length direction one side with respect to the device length direction intermediate portions of the engagement holes 86, a device length direction one side portion of the plate body 22 at an inner peripheral portion of the webbing-insertable portion 26 and the plate body 22 on both device thickness direction sides of the portion on the device length direction one side with respect to the webbing-insertable portion 26 are covered by the webbing protector portion 88. The webbing inserted through the webbing-insertable portion 26 is accordingly abutted by the webbing protector portion 88. The webbing can thus be suppressed from abutting the plate body 22 that is made of metal, and in particular the corners of an inner peripheral edge of the webbing-insertable portion 26.

The protector 80 is further formed with a support wall 90, serving as a load supporting member. The support wall 90 is structured with a substantially U-shaped profile opening toward the device length direction one side as viewed from the device thickness direction one side. A thickness dimension of the support wall 90 is larger (thicker) than thickness dimensions of the cover body 62, the first wall 64, and the second walls 66 of the cover 60, and, for example, the strength and rigidity with respect to load from the device thickness direction one side are greater than those of the cover body 62, the first wall 64, and the second walls 66 of the cover 60. In a state in which the small diameter portion 16 of the attachment pin 12 is disposed penetrating the pin catch portion 30 of the communication hole 24 and the large diameter portion 18 of the attachment pin 12 is disposed on the device length direction another side with respect to the pin restriction portions 56 of the spring plate 40, the majority of the cover 60 is disposed at the inside of the support wall 90.

Next, explanation follows regarding operation and advantageous effects of the present exemplary embodiment.

Figure 4B:
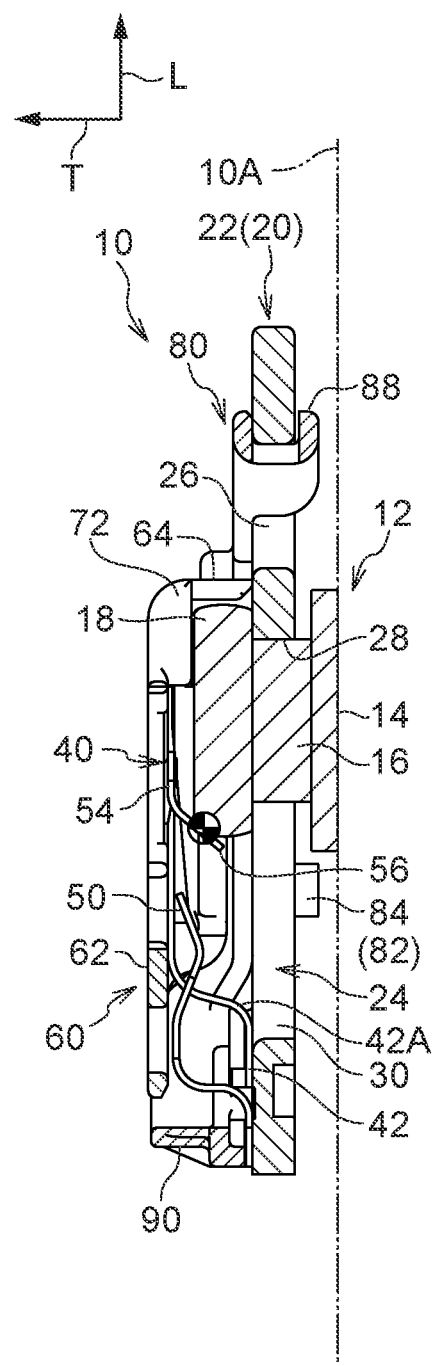

In the anchor device 10 configured as described above, when attachment of the plate 20 to the attachment pin 12 of the vehicle body 10A, the attachment pin 12 is made to penetrate the pin insertion portion 28 of the plate body 22 coupled to the webbing from the device thickness direction another side of the plate body 22. As illustrated in FIG. 4A and FIG. 4B, the large diameter portion 18 of the attachment pin 12 is thereby disposed on the device thickness direction one side of the plate body 22. In this state, the large diameter portion 18 is disposed on the device length direction one side of the pin restriction portions 56 of the tilting movement tab 54 of the spring plate 40.

Figure 5A:
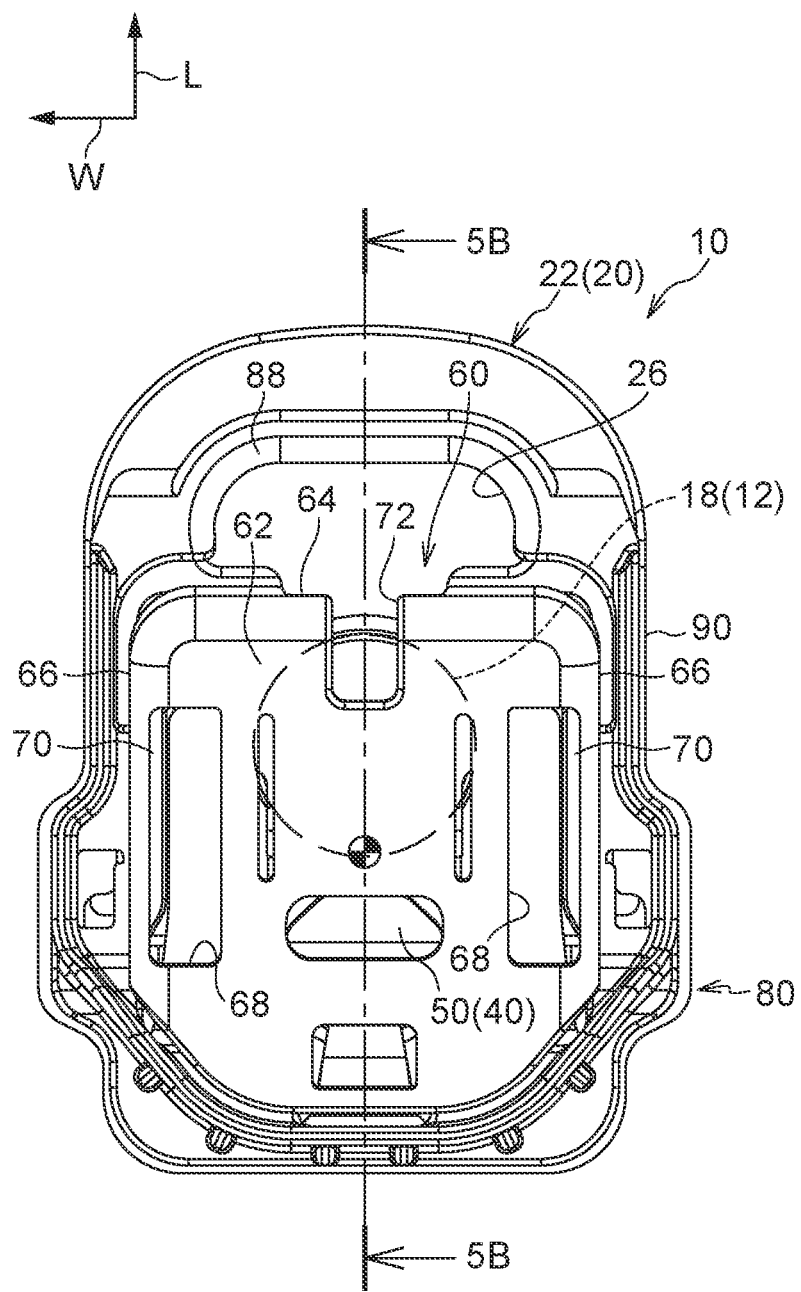
FIGS. 5A and 5B are diagrams illustrating a state in which a pin restriction portion of a spring plate has been pressed by a large diameter portion of an attachment pin and a tilting movement tab of the spring plate has tiltingly moved, FIG. 5A being a plan view as viewed from a device thickness direction one side and FIG. 5B being a cross-section sectioned along line 5B-5B in FIG. 5A.
Figure 5B:
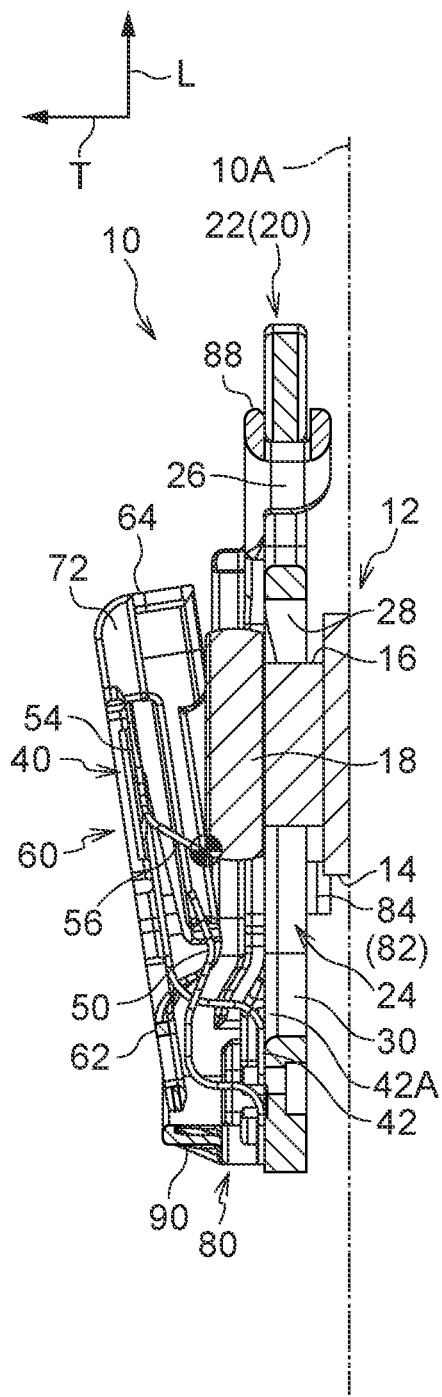

In a state in which the large diameter portion 18 is disposed on the device thickness direction one side of the plate body 22 and the small diameter portion 16 of the attachment pin 12 is disposed inside the pin insertion portion 28, the plate 20 is moved (slid) toward the device length direction one side relative to the attachment pin 12, and thus relative to the vehicle body 10A. As illustrated in FIG. 5A and FIG. 5B, the small diameter portion 16 of the attachment pin 12 is thereby moved from the inside of the pin insertion portion 28 to the inside of pin catch portion 30 of the plate body 22.

When the plate 20 is moved in this manner, as illustrated in FIG. 5A and FIG. 5B, the pin restriction portions 56 of the tilting movement tab 54 of the spring plate 40 are abutted from the device length direction another side by an outer peripheral face of the large diameter portion 18 of the attachment pin 12. When the plate 20 is moved further toward the device length direction one side relative to the attachment pin 12 in this abutting state between the pin restriction portions 56 and the large diameter portion 18, the pin restriction portions 56 of the tilting movement tab 54 are pressed by the large diameter portion 18 from the device length direction one side.

Figure 6A:
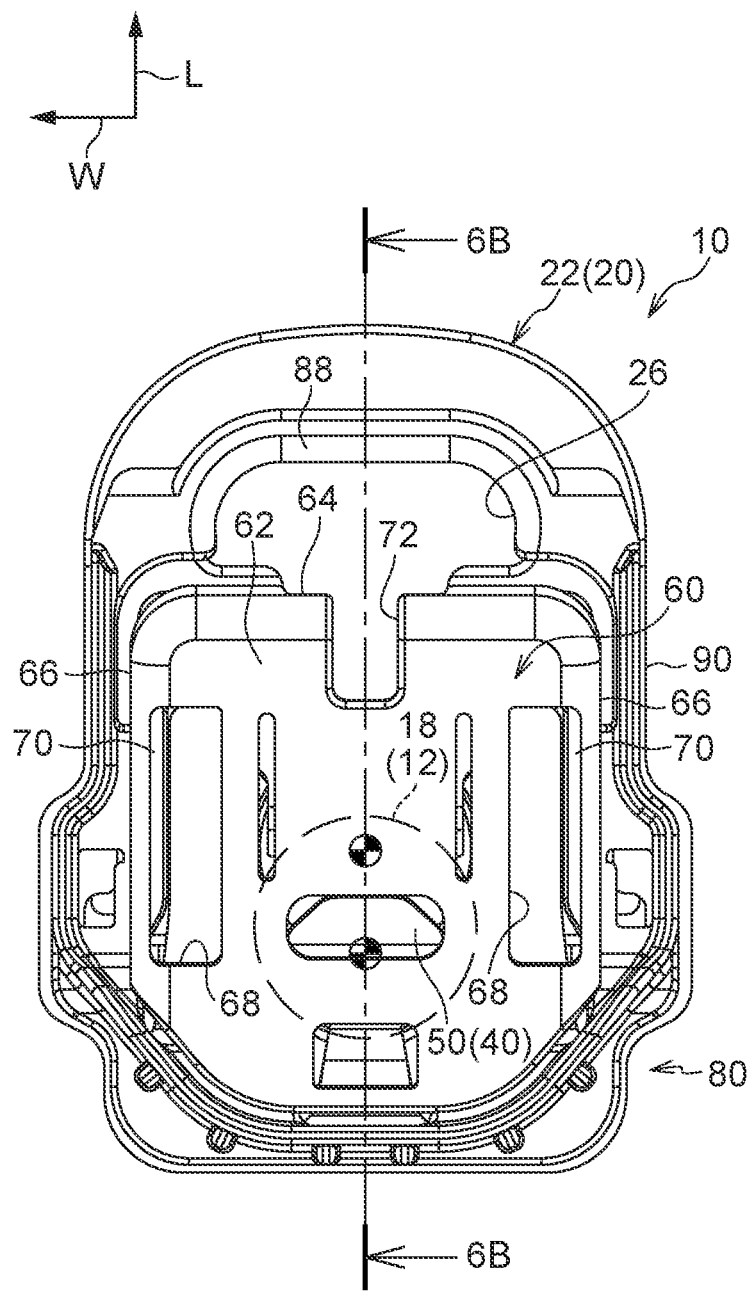

The tilting movement tab 54 accordingly undergoes elastic tilting movement such that the tilting movement tab 54 rotationally moves around an axis whose axial direction runs in the device width direction, centered on a device length direction one side end portion of the tilting movement tab 54. When the tilting movement tab 54 undergoes such tilting movement, as illustrated in FIG. 6A and FIG. 6B, pressing contact is applied to the pin restriction portions 56 such that the pin restriction portions 56 ride over an end face of the large diameter portion 18 (a device thickness direction one side face of the large diameter portion 18).

When the pin restriction portions 56 presses contact the end face of the large diameter portion 18 such that the pin restriction portions 56 ride over the end face of the large diameter portion 18, the device length direction one side end portion of the tilting movement tab 54 is moved toward the device thickness direction one side due to the elasticity of the tilting movement tab 54. The main body portion 52 of the spring plate 40 is thus rotationally moved against the elasticity of the legs 42 toward the device thickness direction one side centered on the legs 42. In this state, the main body portion 52 undergoes tilting movement.

Figure 7A:
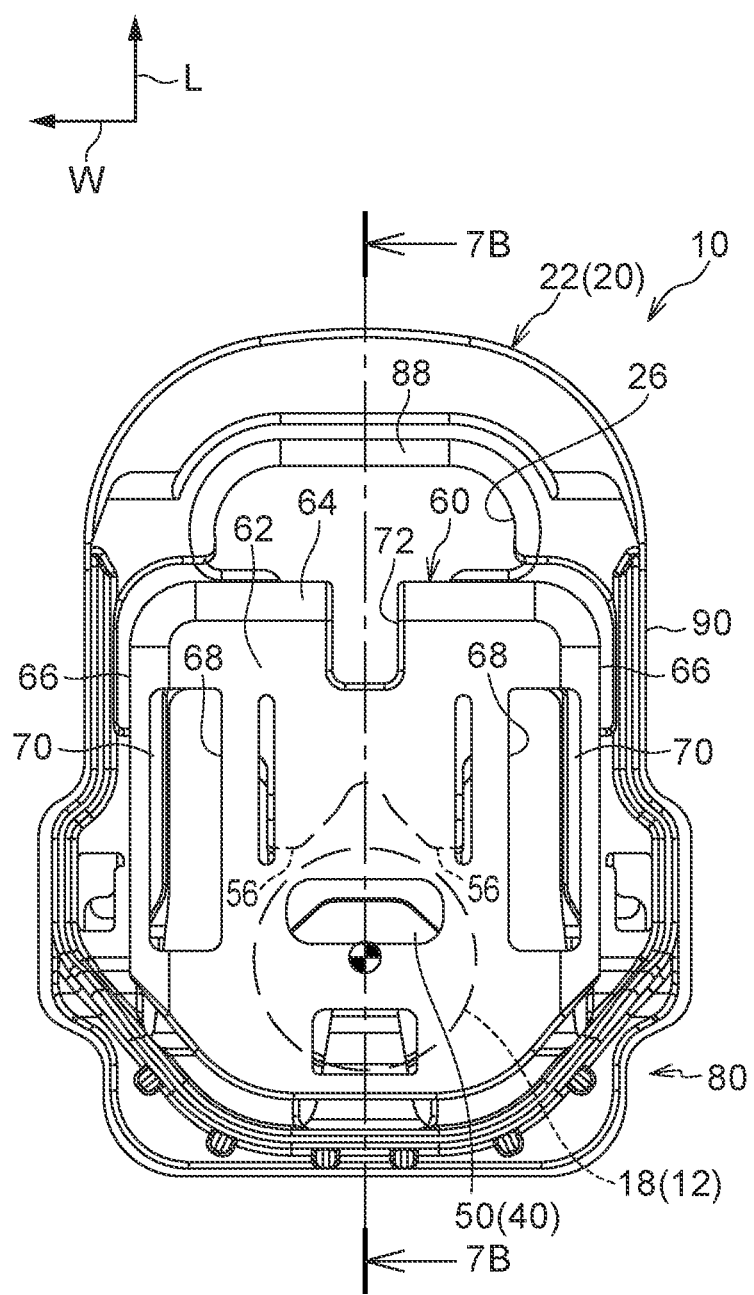
FIGS. 7A and 7B are diagrams illustrating a state in which a large diameter portion of an attachment pin has moved to a device length direction another side of a pin restriction portion of a spring plate, FIG. 7A being a plan view as viewed from a device thickness direction one side and FIG. 7B being a cross-section sectioned along line 7B-7B in FIG. 7A.
Figure 7B:
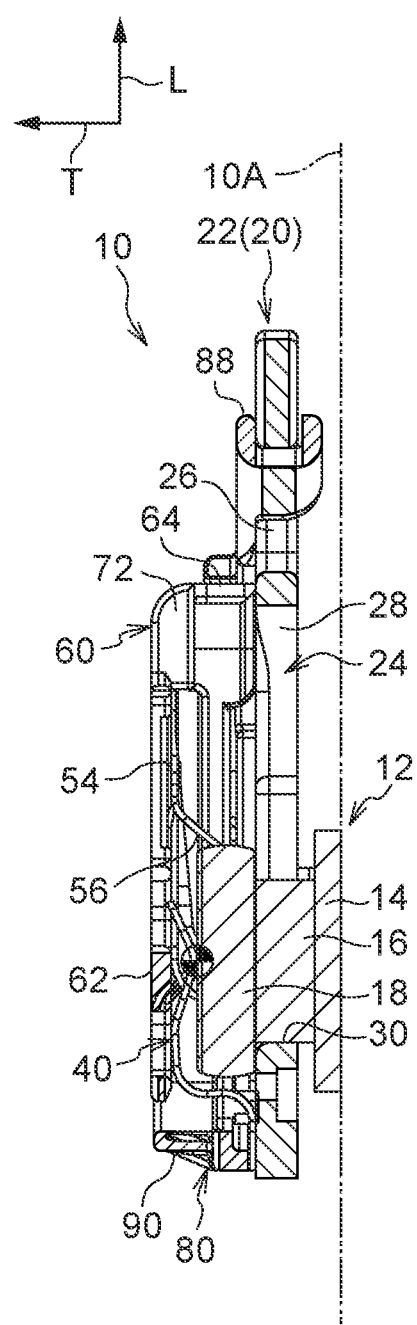

In this state, when the plate 20 is moved further toward the device length direction one side relative to the attachment pin 12 thus the pin restriction portions 56 of the spring plate 40 are moved to the device length direction one side with respect to the large diameter portion 18 of the attachment pin 12, the tilting movement tab 54 of the spring plate 40 recovers under its own elasticity, as illustrated in FIG. 7A and FIG. 7B, the pin restriction portions 56 of the spring plate 40 are disposed on the device length direction one side of the large diameter portion 18.

In this state, movement of the spring plate 40 in the device length direction relative to the attachment pin 12, namely movement of the plate 20 in the device length direction relative to the attachment pin 12, is restricted. Accordingly, when the tilting movement tab 54 of the spring plate 40 recovers under its own elasticity, the main body portion 52 of the spring plate 40 is rotationally moved under the elasticity of the legs 42 toward the device thickness direction another side centered on the legs 42. The main body portion 52 accordingly recovers.

Moreover, in this state, the device length direction one side end portion of the urging portion 50 pressing contact the end face of the large diameter portion 18 of the attachment pin 12 such that the device length direction one side end portion of the urging portion 50 rides onto the end face of the large diameter portion 18 of the attachment pin 12 (the device thickness direction one side face of the large diameter portion 18). In this state, the large diameter portion 18 is sandwiched and gripped between the device length direction one side end portion of the urging portion 50 and the plate body 22 by the urging force of the urging portion 50. Movement of the plate body 22 in the device thickness direction is thereby restricted.

Restricting (blocking) movement of the plate 20 in the device length direction relative to the attachment pin 12 and restricting (blocking) device thickness direction movement of the plate body 22 in this manner couples the plate 20 to the attachment pin 12, and thus couples the webbing to the vehicle body 10A.

Note that the main body portion 52 of the spring plate 40 is disposed between the cover body 62 of the cover 60 and the opposing walls 70 of the cover 60, and device thickness direction movement of the cover 60 relative to the main body portion 52 is restricted. The pin restriction portions 56 of the spring plate 40 are pressed from the device length direction one side by the large diameter portion 18, causing the main body portion 52 to undergo tilting movement such that the cover 60 undergoes tilting movement together with the main body portion 52.

The first wall 64 is formed to the device length direction one side end portion of the cover body 62 of the cover 60, and the second walls 66 are formed to both device width direction side end portions of the cover body 62. Accordingly, the cover 60 has a larger dimension in the device thickness direction than the main body portion 52 of the spring plate 40, this being structured in a substantially flat plate shape. This enables a tilting movement state of the cover 60 to be visually easily confirmed when the cover 60 undergoes tilting movement with the main body portion 52.

When the pin restriction portions 56 of the spring plate 40 are moved to the device length direction one side of the large diameter portion 18 of the attachment pin 12 so the main body portion 52 of the spring plate 40 recovers, the cover 60 returns to its original position. It is possible to visually easily confirm that the cover 60 that has returned to its original position in this manner.

Accordingly, the fact that the pin restriction portions 56 of the spring plate 40 are not yet disposed on the device length direction one side of the large diameter portion 18 of the attachment pin 12, namely the fact that the plate 20 is not yet coupled to the attachment pin 12, can be visually confirmed due to the cover 60 being in the tiltingly moved state (tilted state) described above. Moreover, the fact that the cover 60 has returned to its original position from the tiltingly moved state can also be visually confirmed, enabling the facts that the pin restriction portions 56 of the spring plate 40 are disposed on the device length direction one side of the large diameter portion 18 of the attachment pin 12 and that the plate 20 is coupled to the attachment pin 12 to be confirmed.

Moreover, in the anchor device 10, the main body portion 52 of the spring plate 40 is covered by the cover 60. This enables, for example, foreign objects or a human hand to be suppressed from abutting the tilting movement tab 54 from the exterior of the cover 60 when the plate 20 and the attachment pin 12 are in a coupled state, and enables unintentional operation of the tilting movement tab 54 to be suppressed. The cover 60 is formed with the access hole 72, enabling the tilting movement tab 54 to be operated by using a tool that has been passed through the access hole 72. There is accordingly no need to remove the cover 60 from the main body portion 52 of the spring plate 40 in order to release the coupling between the plate 20 and the attachment pin 12 if required.

Moreover, in the present exemplary embodiment, the cover 60 is disposed to the inside of the support wall 90 of the protector 80. This enables for example a foreign object, human hand, or the like to be suppressed from abutting the tilting movement tab 54 of the spring plate 40 through a gap between the plate body 22 and the cover 60, and thus enables unintentional operation of the tilting movement tab 54 to be suppressed.

Due to disposing the cover 60 at the inside of the support wall 90 of the protector 80, the second walls 66 of the cover 60 can, for example, be suppressed from being held directly. This enables unintentional detachment of the cover 60 from the main body portion 52 of the spring plate 40 to be suppressed.

Moreover, when a load from the device thickness direction one side is applied to the anchor device 10 from a foreign object straddling (across over) portions of the support wall 90 of the protector 80 on both device width direction sides in the device width direction, this load is supported by the support wall 90 of the protector 80. This enables such a load to be suppressed from acting on the cover 60.

Moreover, in the present exemplary embodiment, both device width direction end portions of the main body portion 52 of the spring plate 40 are inserted between the cover body 62 of the cover 60 and the opposing walls 70 that extend from the two second walls 66 of the cover 60, thereby attaching the cover 60 to the main body portion 52 of the spring plate 40. In this configuration, the cover 60 is supported by the main body portion 52 of the spring plate 40 at both device width direction end portions of the cover 60 over the majority of the device length direction. This thereby enables the cover 60 to be effectively suppressed from detaching from the main body portion 52 of the spring plate 40, and enables the cover 60 to follow the tilting movement of the main body portion 52 of the spring plate 40 in the desired manner.

Moreover, the cover 60 can be assembled to the main body portion 52 of the spring plate 40 in a simple assembly operation, namely by performing a sliding movement of the main body portion 52 of the spring plate 40 relative to the cover 60 from the device length direction another side so inserting the main body portion 52 of the spring plate 40 between the cover body 62 and the opposing walls 70 of the cover 60.

Moreover, the main body portion 52 urges the cover 60 toward the device thickness direction another side with the urging force of the legs 42 of the spring plate 40. Due thereto, when a device thickness direction another side end of the first wall 64 and the like of the cover 60 accordingly abut the device thickness direction one side face of the plate body 22 of the plate 20, the cover 60 is prevented from moving toward the device thickness direction another side. In this state, the main body portion 52 of the spring plate 40 is pressed contact with the opposing walls 70 of the cover 60. This enables movement (vibration) of the main body portion 52 of the spring plate 40 in the device thickness direction due to vibrations during vehicle travel or the like to be suppressed, thus enabling contact noise due to such movement (vibration) of the main body portion 52 in the device thickness direction to be suppressed.

Second Exemplary Embodiment and Third Exemplary Embodiment

Next, explanation follows regarding a second exemplary embodiment and a third exemplary embodiment, these being examples in which the coupling between the cover 60 and the main body portion 52 of the spring plate 40 is modified.

Figure 8A:
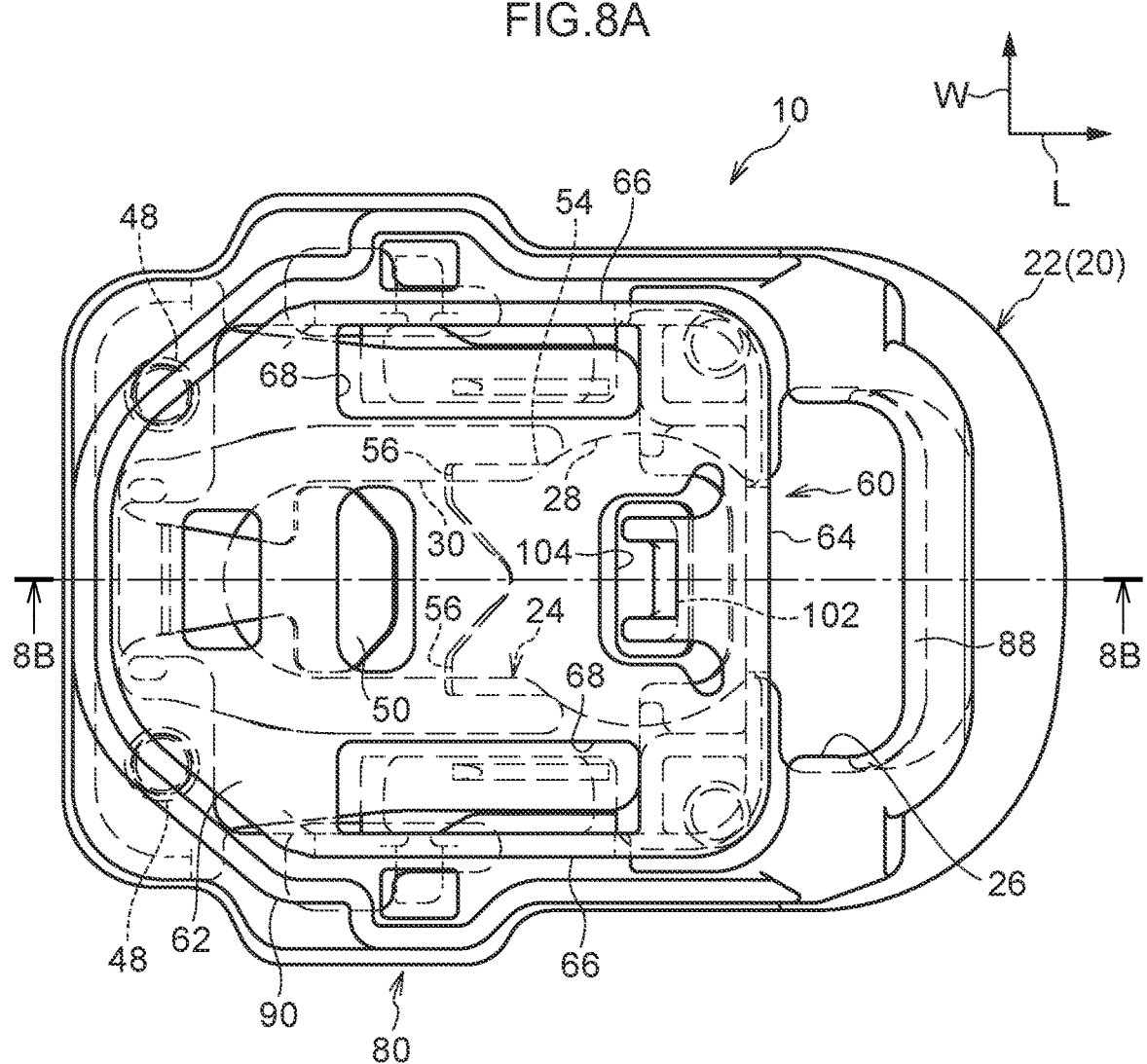
FIG. 8A is a plan view illustrating an anchor device according to a second exemplary embodiment.
Figure 8B:
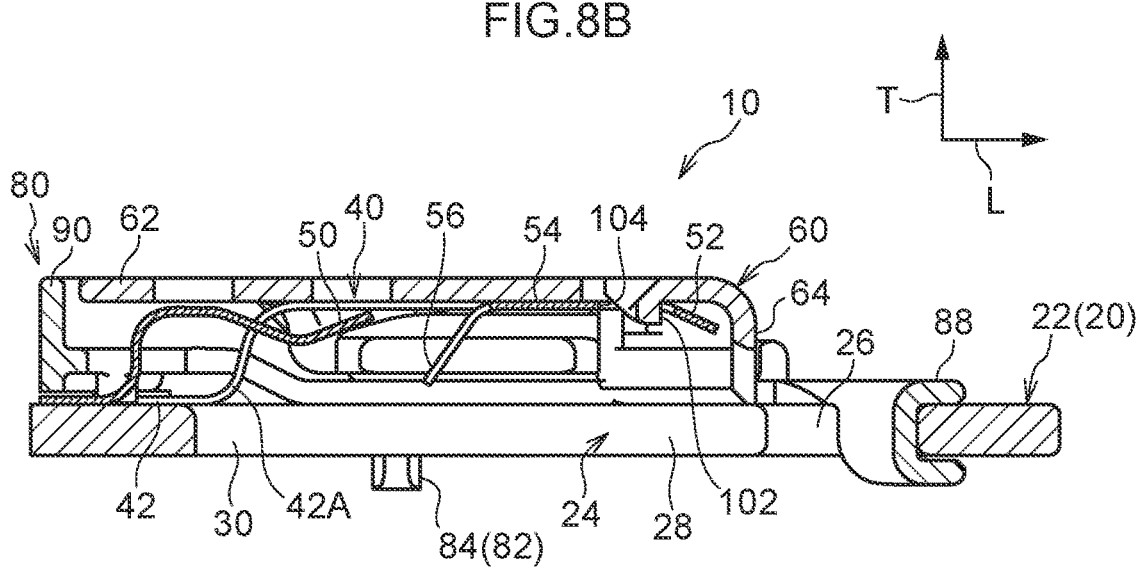
FIG. 8B is a cross-section sectioned along line 8B-8B in FIG. 8A.
Figure 9:
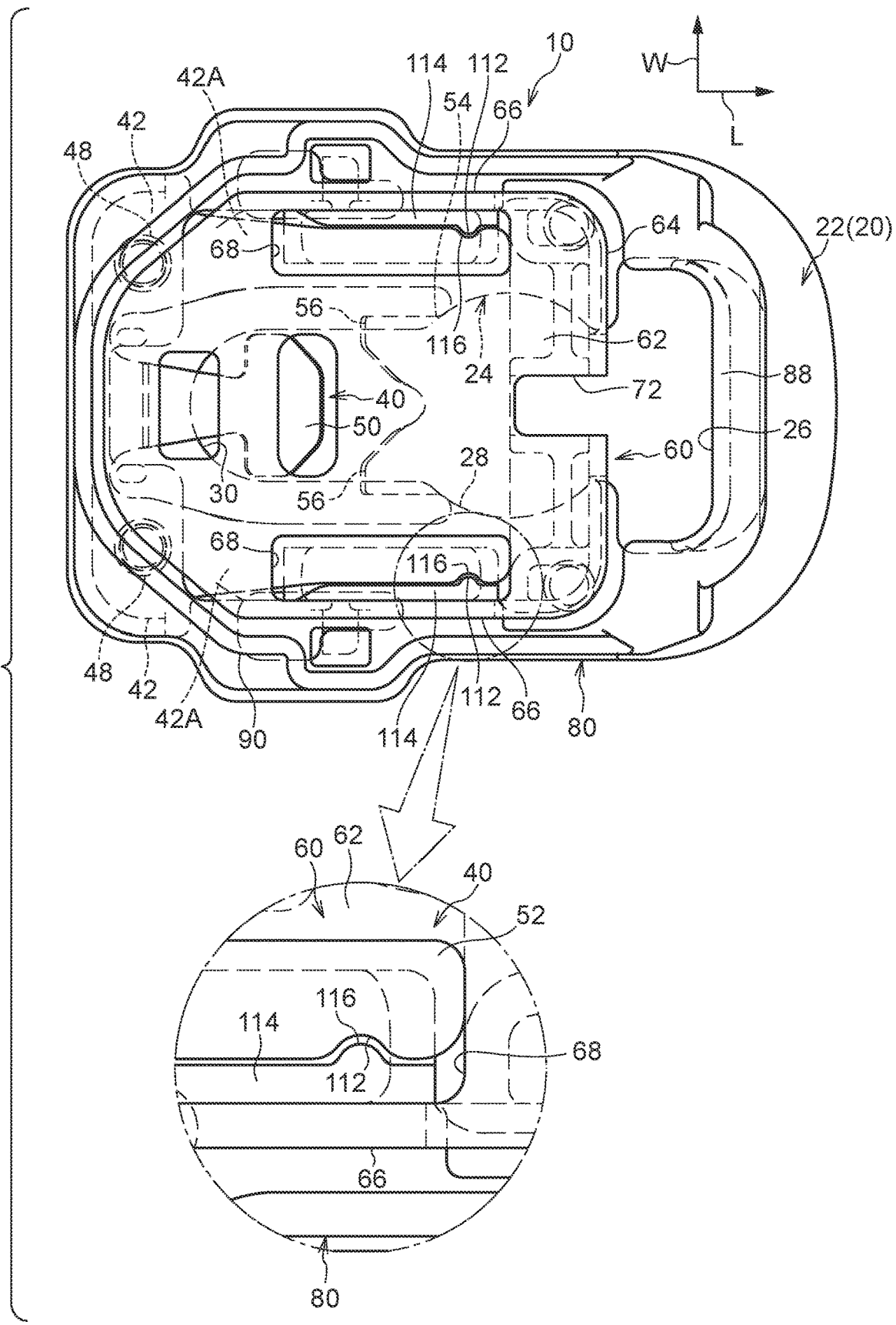
FIG. 9 is a plan view illustrating an anchor device according to a third exemplary embodiment.

As illustrated in FIG. 8A and FIG. 8B, in the second exemplary embodiment the main body portion 52 of the spring plate 40 is formed with an engagement hole 104. A coupling claw 102 projecting toward the device thickness direction another side is formed on a device thickness direction another side face of the cover body 62 of the cover 60 corresponding to the engagement hole 104 that penetrates the main body portion 52. The coupling claw 102 penetrates the engagement hole 104 such that the coupling claw 102 is coupled to the main body portion 52 of the spring plate 40.

As illustrated in FIG. 9A and FIG. 9B, in the third exemplary embodiment recesses 112 are formed in both device width direction end portions of the main body portion 52 of the spring plate 40. The recess 112 on the device width direction one side is formed in a device width direction one side end of the main body portion 52 so as to open toward the device width direction one side, and the recess 112 on the device width direction another side is formed in a device width direction another side end of the main body portion 52 so as to open toward the device width direction another side.

Moreover, in the exemplary embodiment extension tabs 114 are formed to the respective second walls 66 of the cover 60 instead of the opposing walls 70. The extension tab 114 of the second wall 66 which is on the device width direction one side extends from a device width direction another side face of the second wall 66 on the device width direction one side toward the device width direction one side end of the main body portion 52 of the spring plate 40. A device width direction another side end of the extension tab 114 on the device width direction one side is formed with a protrusion 116 projecting toward the device width direction another side. The protrusion 116 fits together with the recess 112 on the device width direction one side.

The extension tab 114 of the second wall 66 which is on the device width direction another side extends from a device width direction one side face of the second wall 66 on the device width direction another side toward the device width direction another side end of the main body portion 52 of the spring plate 40. A device width direction one side end of the extension tab 114 on the device width direction another side is formed with a protrusion 116 projecting toward the device width direction one side. The protrusion 116 fits together with the recess 112 on the device width direction another side. The two protrusions 116 are fitted together with the two recesses 112 in this manner so as to couple the cover 60 to the main body portion 52 of the spring plate 40.

In the configurations of the second exemplary embodiment and the third exemplary embodiment described above, the cover 60 undergoes tilting movement together with the main body portion 52 of the spring plate 40, and the main body portion 52 recovers so as to return the cover 60 to its original position. This enables whether or not the plate 20 has been coupled to the attachment pin 12 to be visually confirmed by visual inspection of the cover 60.

Moreover, only the specific aspect (structure) of the coupling between the cover 60 and the main body portion 52 of the spring plate 40 differs from the first exemplary embodiment. The second exemplary embodiment and the third exemplary embodiment are thus capable of obtaining basically the same advantageous effects as the first exemplary embodiment.

Fourth Exemplary Embodiment and Fifth Exemplary Embodiment

Next, explanation follows regarding a fourth exemplary embodiment and a fifth exemplary embodiment, these being examples in which the cover 60 is modified.

Figure 10A:
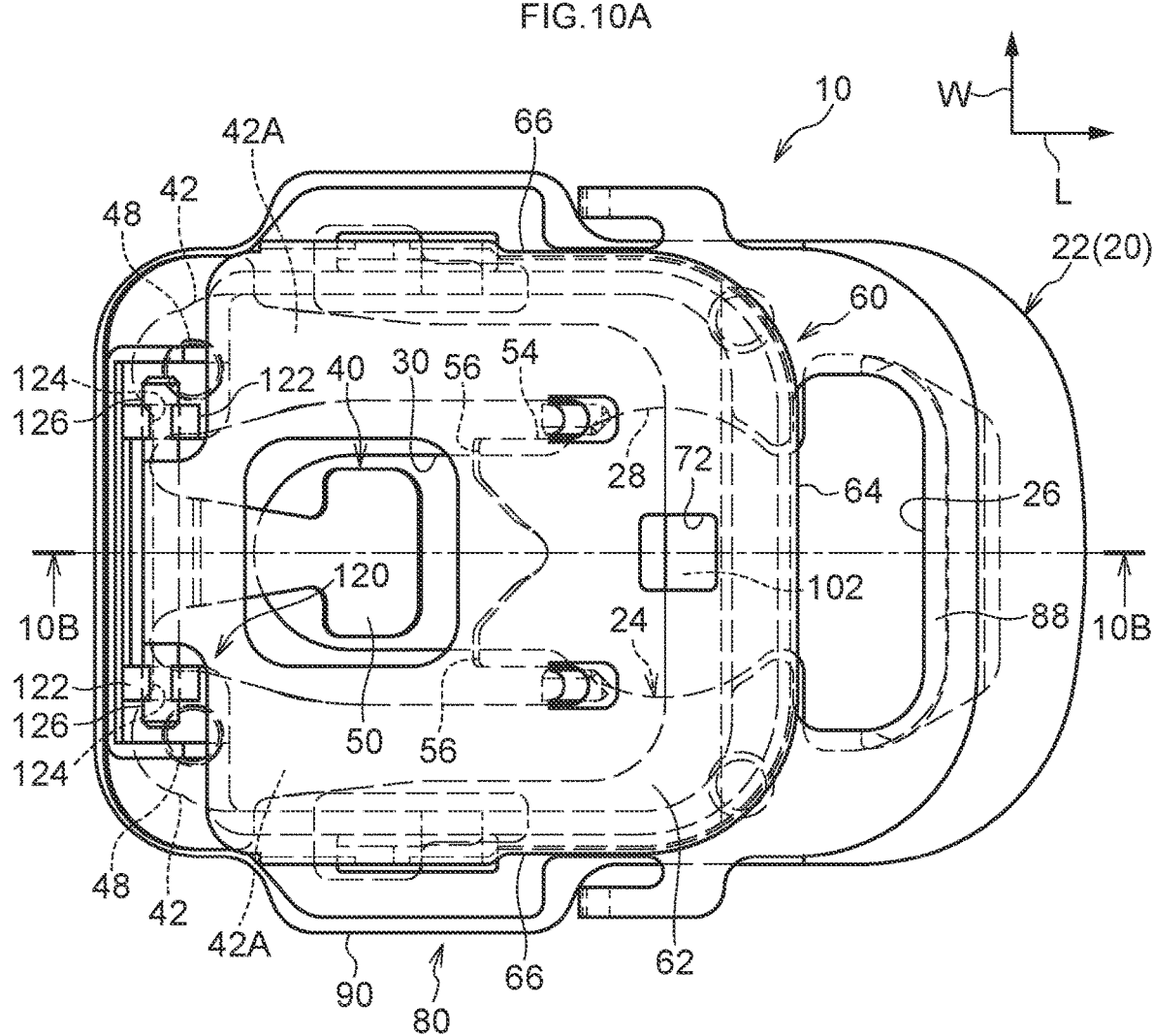
FIG. 10A is a plan view illustrating an anchor device according to a fourth exemplary embodiment.
Figure 10B:
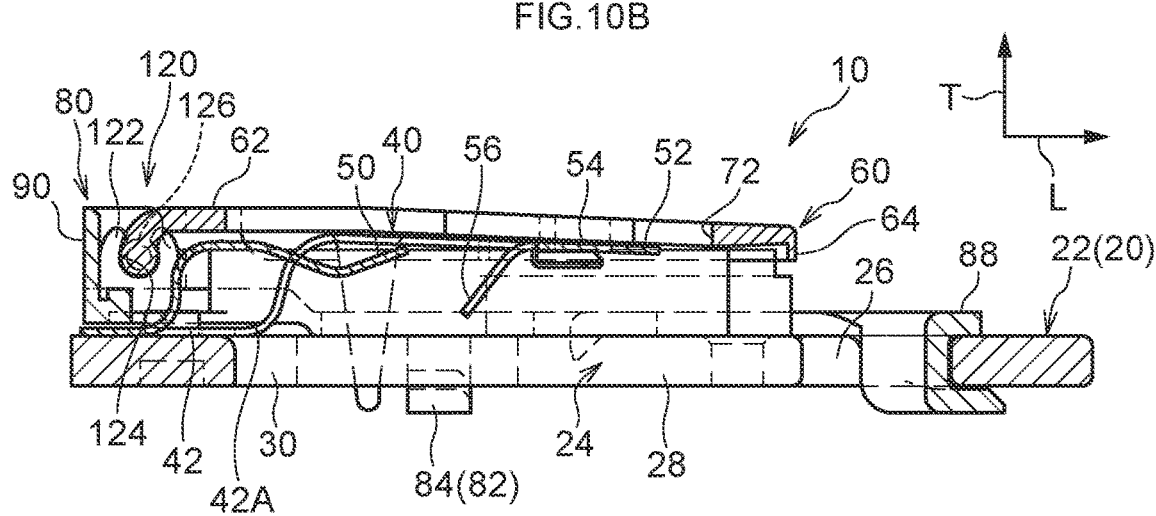
FIG. 10B is a cross-section sectioned along line 10B-10B in FIG. 10A.

As illustrated in FIG. 10A and FIG. 10B, in the fourth exemplary embodiment the anchor device 10 includes a hinge 120. The hinge 120 includes a pair of hinge bases 122. One of the hinge bases 122 is formed to the protector 80 on the device length direction one side with respect to a device width direction one side end portion of a device length direction another side end portion of the support wall 90 of the protector 80. The other of the hinge bases 122 is formed to the protector 80 on the device length direction one side with respect to a device width direction another side end portion of the device length direction another side end portion of the support wall 90 of the protector 80. Each of the hinge bases 122 is formed with a support hole 124. The support holes 124 penetrate the hinge bases 122 in the device width direction. The support holes 124 open toward the device thickness direction one side. The support hole 124 of the one hinge base 122 is formed coaxially with the support hole 124 of the other hinge base 122.

The hinge 120 further includes a pair of hinge shafts 126. One of the hinge shafts 126 extends from a device length direction another side end portion of the cover body 62 of the cover 60 toward the device width direction one side. This one hinge shaft 126 is inserted into the support hole 124 of the hinge base 122 on the device width direction one side, and the one hinge shaft 126 is supported by the hinge base 122 on the device width direction one side so as to be capable of rotational movement around an axis whose axial direction runs in the device width direction.

The other hinge shaft 126 extends from a device length direction another side end portion of the cover body 62 of the cover 60 toward the device width direction another side. This other hinge shaft 126 is provided coaxially with the one hinge shaft 126, and is inserted into the support hole 124 of the hinge base 122 on the device width direction another side. The other hinge shaft 126 is supported by the hinge base 122 on the device width direction another side so as to be capable of rotational movement around an axis whose axial direction runs in the device width direction.

In this manner, in the exemplary embodiment the cover 60 and the protector 80 are coupled together by the hinge 120. As an example, in the present exemplary embodiment the cover 60 is coupled to the main body portion 52 of the spring plate 40 by a similar configuration to that of the second exemplary embodiment or the third exemplary embodiment.

Figure 11:
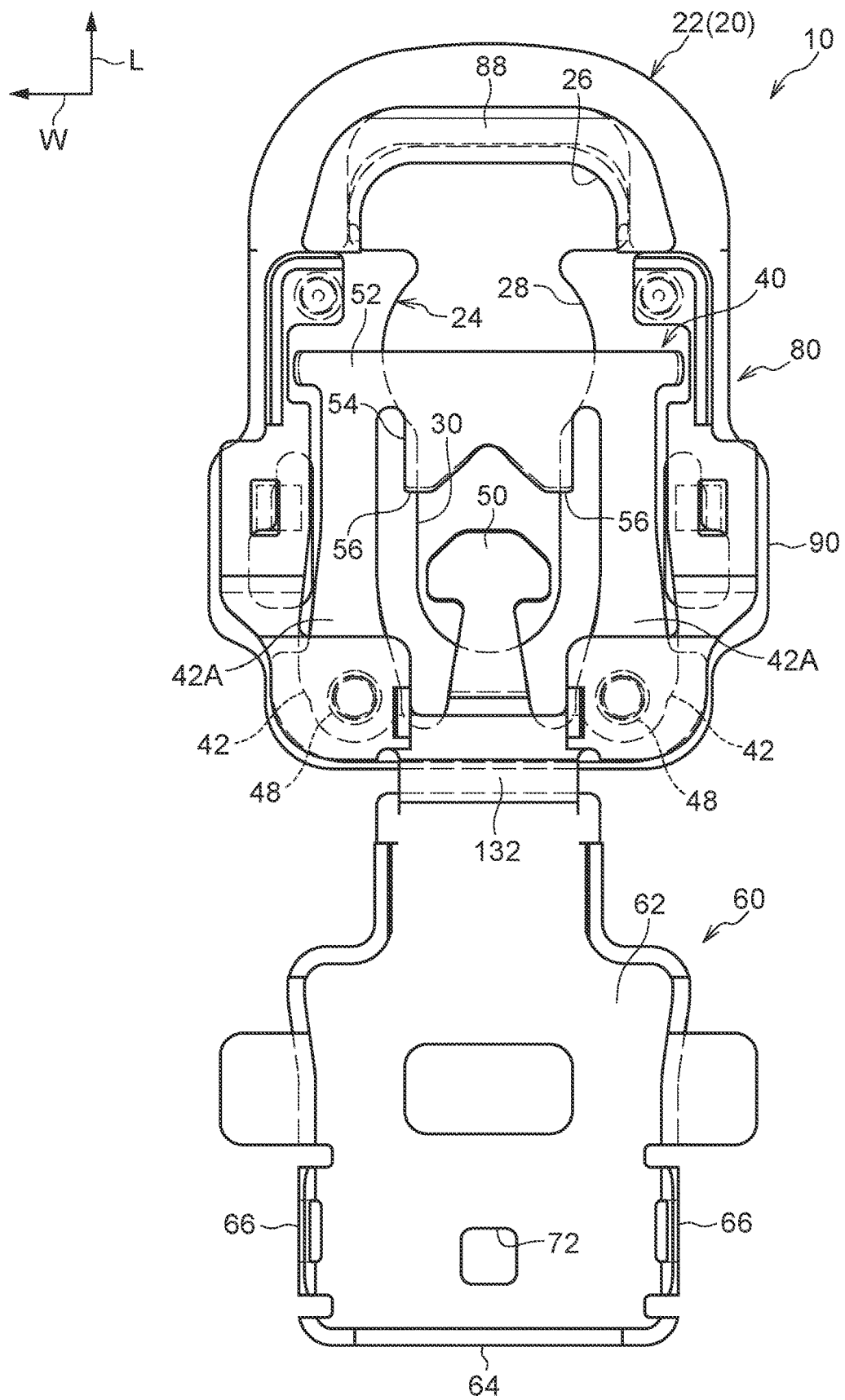
FIG. 11 is a plan view illustrating an anchor device according to a fifth exemplary embodiment in a state in which a cover and a protector have been opened out flat.

As illustrated in FIG. 11 and FIG. 12, in the fifth exemplary embodiment the anchor device 10 includes an integral hinge 132, serving as a hinge. The device length direction another side end of the cover body 62 of the cover 60 and the device length direction another side end of the protector 80 are coupled together by the integral hinge 132. The integral hinge 132 is, for example, thinner than the cover body 62 of the cover 60, and is capable of bending around an axis whose axial direction runs in the device width direction. In a state in which the integral hinge 132 is bent so the cover body 62 of the cover 60 opposes the main body portion 52 of the spring plate 40 substantially in the device thickness direction, the cover 60 is coupled to the main body portion 52 of the spring plate 40 by using a similar configuration to that of the second exemplary embodiment or the third exemplary embodiment described above.

Namely, the cover 60 and the protector 80 may be mechanically coupled together as in the fourth exemplary embodiment or the fifth exemplary embodiment.

Note that in the respective exemplary embodiments described above, the length direction leading end portion of the webbing is anchored to the plate body 22 that serves as a first member, and the attachment pin 12 that serves as a second member is provided to the vehicle body 10A. However, configuration may be made in which the plate body 22 is provided to the vehicle body 10A, that serves as a second member, and the attachment pin 12 configures a first member in a configuration in which the length direction leading end portion of the webbing is anchored to the attachment pin 12.

What is claimed is:

1. An anchor device comprising:
    a first member that is provided at one of a vehicle body side of a vehicle so as to be fixed at the vehicle body side or a webbing side of the vehicle;
    a second member that is provided at another of the vehicle body side so as to be fixed at the vehicle body side or the webbing side of the vehicle, the second member being coupled to the first member by the second member being moved relative to the first member in a coupling direction intersecting a penetration direction of the second member with respect to the first member in a state in which the second member penetrates the first member;
    a restriction member that is provided at the first member and that has a restriction portion which is moved toward one side in a direction of movement of the restriction portion due to pressing from the second member by being pressed by the second member when the second member is moved relative to the first member in the coupling direction so as to couple to the first member, the restriction portion restricting movement of the second member relative to the first member in a direction opposite to the coupling direction by the restriction portion moving toward another side in a direction of movement of the restriction portion due to pressing from the second member which is opposite to the one side due to pressing by the second member being released in a state in which the second member is coupled to the first member; and
    a cover that is provided at the restriction member, that covers the restriction portion from the one side, and that is tilted toward the one side with respect to the first member due to the restriction portion being moved toward the one side by being pressed by the second member.

2. The anchor device of claim 1, wherein
one of the cover or the restriction portion includes opposing portions that mutually oppose each other in the direction of movement of the restriction portion due to pressing from the second member, and another of the cover or the restriction portion is disposed between the opposing portions.

3. The anchor device of claim 2, further comprising
a load supporting member that is provided by a side of the cover in a direction intersecting the direction of movement of the restriction portion due to pressing from the second member, that is capable of supporting a load which is from the side in the direction of movement of the restriction portion due to pressing from the second member, and that suppresses the load from acting on the cover by supporting the load.

4. The anchor device of claim 1, further comprising
a load supporting member that is provided by a side of the cover in a direction intersecting the direction of movement of the restriction portion due to pressing from the second member, that is capable of supporting a load which is from the side in the direction of movement of the restriction portion due to pressing from the second member, and that suppresses the load from acting on the cover by supporting the load.

5. The anchor device of claim 1, wherein the cover and the restriction member are different members, and the cover is attached to the restriction portion formed at the restriction member such that relative movement of the restriction portion and the cover in the direction of movement of the restriction portion due to pressing from the second member is restricted, so that the cover is tilted toward the one side with respect to the first member due to the restriction portion being tilted toward the one side with respect to the first member.

6. The anchor device of claim 5, wherein one of the cover or the restriction portion includes opposing portions that mutually oppose each other in the direction of movement of the restriction portion due to pressing from the second member, and another of the cover or the restriction portion is disposed between the opposing portions, such that the relative movement of the restriction portion and the cover in the direction of movement being restricted by the opposing portions.

7. The anchor device of claim 6, wherein one side portion of the restriction member in the coupling direction is fixed at the first member, and the restriction portion is formed at another side portion the restriction member in the coupling direction.

8. The anchor device of claim 7, wherein the first member is provided at the webbing side, and the second member is fixed at the vehicle body side.

9. The anchor device of claim 5, wherein one side portion of the restriction member in the coupling direction is fixed at the first member, and the restriction portion is formed at another side portion of the restriction member in the coupling direction.

10. The anchor device of claim 9, wherein the first member is provided at the webbing side, and the second member is fixed at the vehicle body side.

* * * * *